Patented Jan. 3, 1950

2,493,324

UNITED STATES PATENT OFFICE

2,493,324

POLYOXYETHYLENE ESTERS FOR IMPROVING FROZEN CONFECTIONS

Arnold B. Steiner and Aaron Miller, La Jolla, Calif., assignors to Kelco Company, San Diego, Calif., a corporation of Delaware No Drawing. Application March 3, 1947, Serial No. 732,128

12 Claims. (Cl. 99—136)

This invention relates to improvements in the manufacture of ice cream and other frozen milk products.

The invention relates specifically to certain additives which, when used in ice cream mixes, permit the production of a drier ice cream, of better texture and body, than has heretofore been attainable, and which produce a greater overrun in a shorter time than has been possible in the use of stabilizing agents or compositions heretofore known.

An ice cream mix consists essentially of a mixture of creams, milks and sugars so proportioned as to contain desired percentages of sugar, butter fat and milk solids. These proportions vary with trade requirements but may be said to average about 12% butter fat, 10% serum solids and 16% sugar by weight.

To produce an ice cream having a smooth body and to prevent the growth of ice crystals in storage it is customary to add a small proportion of a stabilizer such as sodium alginate, gelatin or carboxymethyl cellulose.

The alginate is ordinarily used in the form of a composition containing about 50% by weight of sodium alginate, with sugars added to improve the solubility in water and with a small proportion of sodium phosphate added to render it compatible with the calcium ions of milk. Such a composition is described in United States Patents 2,097,228, 2,097,229 and 2,097,231 and for brevity will be referred to hereinafter as "alginate composition."

The gelatins marketed for ice cream stabilization vary in gel strength from about 125 to 300 Bloom test. It has been established that the value of gelatin as a stabilizer is dependent on, or at least closely parallel to the gel strength. References to gelatin herein are to a product of 200 Bloom and it will be understood that as the gel strength diminishes the quantity required to produce unit stabilization increases, and vice versa.

Sodium carboxymethyl cellulose, known also as sodium cellulose glycollate and as cellulose gum, is the sodium salt of the product of reaction between monochloracetic acid and alkali cellulose. It is usually supplied to the trade as a white powder, soluble or dispersible in water and in alkaline solutions.

The type of cellulose gum sold for use in ice cream mixes is of good viscosity and is usually combined with other stabilizers or with sugar or other suitable carriers to make it readily soluble in water or in ice cream mixes. References to quantities of this additive will be understood to refer to sodium carboxymethyl cellulose itself, excluding any substances such as carriers which may be added to it.

To improve the whipping ability of ice cream mixes, egg solids and particularly egg yolks are often added. Limiting considerations in the use of these agents are the cost of eggs, their availability and the labor involved in their preparation. The characteristic taste which they impart to ice cream is also objected to by some manufacturers.

We have discovered that the whipping ability of ice cream mixes may be improved greatly and the foreign flavor introduced by the use of eggs entirely avoided by adding to the preferred stabilizer (which may be any one or combination of the three above described) a small proportion of a suitable surface active agent, such for example as one of the polyoxyethylene derivatives of stearic acid.

These derivatives are commonly produced by reaction of from about 10 to about 50 moles of ethylene oxide with one mole stearic acid of commercial purity, a theoretical formula for the reaction with 20 moles of the oxide being as follows:

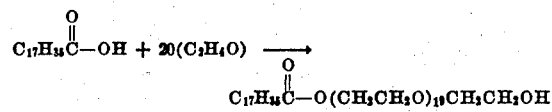

The same product may also be made by reacting the corresponding polyethylene glycol with stearic acid.

The 20 molar product has a titer test ranging from 32 to 36° C., the titer of the 30 mol product is in the range 35 to 40° C., that of the 40 molar product is in the range 38 to 43° C. and that of the 50 molar product is in the range 37 to 42° C. All are waxy products of pale color, soluble or dispersible in water and having different solubilities in organic solvents.

In the preparation of an additive for ice cream mixes the stabilizer and the surface active agent should be intimately intermixed, preferably with the addition of a third agent, termed for convenience a drying agent, which tends to accelerate solution by maintaining the particles of composition in discrete condition and thus aiding their dispersion in the aqueous liquid. This drying agent may be any edible solid substance which is readily water-soluble and capable of being reduced to a fine powder and which is free from any objectionable taste or flavor, typical examples being dextrin, milk powder and sugar.

These three components—stabilizer, surface active agent and drying agent—having previously been reduced to powdered form, may merely be intermixed, but the best results are obtained by a systematic procedure based on the different physical properties of the three components.

Thus, the stabilizer, a hydrophilic colloid which does not fuse on heating, tends somewhat to clump when introduced in powdered form into an aqueous liquid, this tendency retarding complete solution. The tendency to clumping may be corrected by coating the grains of stabilizer with the surface active agent, which is readily fusible. Such coatings, however, render the mass slightly sticky and may cause it to impact in transit or storage. This very undesirable tendency may, in turn, be overcome by providing a second coating of a finely powdered substance which has no agglomerating characteristic and which is freely dispersible in water.

With these characteristics in view we prefer to proceed as follows. The surface active agent is gently heated to fusion and blended with strong agitation with the powdered stabilizer. Or, still better, a mixure of stabilizer and surface active agent is heated to the fusing point of the latter and agitated in the heated condition until the molten agent is intimately dispersed throughout the mass in the form of thin coatings over the particles of stabilizer. The drying and solution-accelerating agent, in the form of the finest possible powder, is then added and agitation continued until the drying agent is uniformly distributed over the surfaces of the particles as a cohesion-resisting outer layer. The mass thus obtained shows no tendency to agglomerate or impact in storage nor to clump when introduced into an aqueous liquid such as an ice cream mix, and passes into solution at least as readily as the particular stabilizer present in the composition.

As the drying agent is itself a food product and entirely inert as regards stabilization, it may be used in any quantity required to maintain the finished blend in the form of discrete particles and to assist in dispersing these particles through the mix. Due allowance must of course be made for the inert matter in calculating the quantity of the blend to be used in any given instance.

The quantity of stabilizer to be added to the ice cream mix to produce the optimum result varies with the specific stabilizing value of the agent selected, sodium alginate having the highest unit stabilizing value, cellulose gum the next and gelatin the least, these values differing in approximately the ratio 1.0:0.7:0.4. In most cases satisfactory stabilization will be attained with the use of about 0.125 weight per cent of sodium alginate (double that quantity of the 50% alginate composition), with about 0.17% of cellulose gum and with about 0.35% of 200 Bloom gelatin.

One of the functions of the surface active agent is that of an emulsifier for the butter fat and the optimum weight percentage of this agent varies slightly with the butter fat content of the mix. Ordinarily the optimum improvement in whipping ability and smoothness is obtained with the use of about 0.04% by weight of the stearic acid derivative.

As above said, the drying agent may be added in any necessary quantity but ordinarily a quantity more or less equal to that of the surface active emulsifying agent is sufficient to produce the best results. In the table below the small quantity of drying agent added in the use of the alginate composition is due to the presence in that composition of a large proportion, something less than 50%, of an agent having the same function.

Assembling the above figures we find for the preferred percentage composition of the additive based on each individual stabilizing agent, and for the preferred quantity of each component and of the total additive to be used with 100 pounds of the ice cream mix, the figures shown by the following table:

| | Per cent of Additive | Pounds in 100# Mix |
|---|---|---|
| *Alginate Stabilizer* | | |
| Alginate composition (50%) | 83.3 | 0.250 |
| Stearic Acid Derivative | 13.3 | 0.040 |
| Drying Agent | 3.4 | 0.010 |
| Total Additive | 100.0 | 0.300 |
| *Cellulose Gum Stabilizer* | | |
| Sodium Carboxymethyl cellulose | 68.0 | 0.170 |
| Stearic Acid Derivative | 16.0 | 0.040 |
| Drying Agent | 16.0 | 0.040 |
| Total Additive | 100.0 | 0.250 |
| *Gelatin Stabilizer* | | |
| 200 Bloom Gelatin | 77.0 | 0.350 |
| Stearic Acid Derivative | 9.2 | 0.040 |
| Drying Agent | 13.8 | 0.060 |
| Total Additive | 100.0 | 0.450 |

The above figures for pounds in mix represent about the minima called for in ordinary practice. Larger quantities may be used without detriment to the properties of the mix, but also without sufficient added improvement to compensate the added cost.

Each of the above additives may be introduced into the mix in the manner which would give the best results if the stabilizer alone were being added. Thus, the alginate additive may be stirred into one or two parts of water to form a slurry which is then stirred into the mix at the time of pasteurization. The cellulose gum additive is best dispersed in a part of the dry sugar required in the mix and sifted into it prior to or during pasteurization, while the gelatine additive is preferably suspended in the cold mix before it goes to the pasteurizing step.

Various benefits are realized in the use of the combination stabilizers above described, though only the improvement in the whipping characteristic is capable of expression in figures. The extent of this improvement is illustrated by the following figures, which set forth the average time required for whipping to 100% overrun, under standardized conditions, with each stabilizer and both with and without the stearic acid derivative.

| | Stabilizer | | |
|---|---|---|---|
| | Alginate | Cellulose Gum | Gelatin |
| | Freezing Time | | |
| Stabilizer alone | 15′ 30″ | 16′ 00″ | 19′ 20″ |
| Stabilizer+Emulsifier | 11′ 10″ | 11′ 20″ | 14′ 40″ |
| Time Reduction | 4′ 20″ | 4′ 40″ | 4′ 40″ |
| Time Reduction, per cent | 28 | 29 | 24 |

This reduction in freezing time is important in a plant which is working to capacity as it permits a corresponding increase of output from a given freezer installation. Power and refrigeration demands are correspondingly reduced.

The use of these combination stabilizing and emulsifying agents produces an ice cream having a stiffer and drier body at the freezer, making the products easier to handle and to package. It also permits the ice cream to be frozen at a lower temperature without sacrificing overrun or interference with the readiness with which the frozen product may be withdrawn from the freezer.

Frozen milk products made with these combination stabilizers are of superior quality, being smoother, drier and creamier than those made with the unmodified stabilizer. The products have better body and texture, probably by reason of the function of the surface active agent in emulsifying the butter fat, preventing fat clumping and producing smaller air cells in the ice cream, this condition being maintained during storage by the stabilizing element of the combination. The production of small and uniform air cells results in a stronger physical structure.

While the best results in the use of the surface active agent are obtained in the combination of this agent with algin, cellulose gum or gelatin, it is possible to use it in other combination or even alone with the production of a beneficial effect on the properties of the ice cream mix. Thus, in combinations similar to those above recited, the other hydrophilic colloids Irish moss, gum karaya, locust bean gum, psyllium seed and quince seed gum, guar gum and gum tragacanth, may be used as part or all of the stabilizing component.

It is also possible, particularly where the ice cream is being prepared for immediate consumption, to use the stearic acid derivative in the ice cream mix without adding a stabilizer. In this case, because of the very minute quantity required, it is desirable to blend the surface active agent with a liberal quantity of one of the drying agents above mentioned, such agent also facilitating the dispersal of the surface active agent through the mix. Any of these combinations, or the stearic acid derivative per se, will improve the whipping ability of an ice cream or ice milk mix if added in suitable quantity.

We claim as our invention:

1. A frozen confection mix additive comprising an edible hydrophilic stabilizing colloid, and polyoxyethylene ester of stearic acid.

2. A frozen confection mix additive comprising an edible hydrophilic stabilizing colloid, and polyoxyethylene ester of stearic acid, the polyoxyethylene radical of which corresponds to from 10 moles to 50 moles of ethylene oxide.

3. A frozen confection mix additive comprising an edible hydrophilic stabilizing colloid, and polyoxyethylene ester of stearic acid, and an edible drying agent.

4. A frozen confection mix additive comprising finely divided, edible hydrophilic stabilizing colloid, having a first coating of a surface active agent consisting essentially of polyoxyethylene ester of stearic acid, and a second coating of an edible drying agent.

5. The composition of claim 1 wherein the stabilizing colloid is a water-soluble alginate.

6. The composition of claim 1 wherein the stabilizing colloid is a cellulose gum.

7. The composition of claim 1 wherein the stabilizing colloid is gelatin.

8. A frozen milk product containing a small but effective proportion of an additive comprising an edible hydrophilic stabilizing colloid, and polyoxyethylene ester of stearic acid.

9. An ice cream mix containing a small but effective proportion of an additive comprising an edible hydrophilic stabilizing colloid, and polyoxyethylene ester of stearic acid.

10. An ice cream mix containing a small but effective proportion of an additive comprising an edible hydrophilic stabilizing colloid, polyoxyethylene ester of stearic acid and an edible drying agent.

11. The product of claim 8 further characterized in that the stabilizing colloid is a water-soluble alginate.

12. The composition of claim 1 wherein the hydrophilic stabilizing colloid is sodium alginate.

ARNOLD B. STEINER.
AARON MILLER.

REFERENCES CITED

The following references are of record in the file of this patent:

UNITED STATES PATENTS

| Number | Name | Date |
|---|---|---|
| 2,269,529 | Goldsmith | Jan. 13, 1942 |
| 2,398,950 | Moore | Apr. 23, 1946 |
| 2,422,145 | Taylor | June 10, 1947 |
| 2,422,486 | Johnston | June 17, 1947 |

OTHER REFERENCES

Atlas Spans and Atlas Tweens, reprinted by Atlas Powder Co., June 1945, Wilmington, Del., pages 1, 2, 11, 16.